Patented Oct. 12, 1954

2,691,658

UNITED STATES PATENT OFFICE 2,691,658

2-(α-PHENYLAMINOETHYL)-IMIDAZOLINE AND ITS SALTS

Karl Miescher, Riehen, and Ernst Urech, Binningen, Switzerland, assignors to Ciba Pharmaceutical Products, Inc., Summit, N. J.

No Drawing. Application June 28, 1951, Serial No. 234,138

Claims priority, application Switzerland July 5, 1950

3 Claims. (Cl. 260—309.6)

The present invention relates to 2-(α-phenylaminoethyl)-imidazoline and its acid salts.

A primary object of the present invention is the embodiment of a new group of compounds possessing the property of stimulating the heart of warm-blooded animals and thereby producing a strong coronary dilatation and an increase in the pulse rate. This object, and others which will be evident from the following disclosure, is realized according to the present invention by 2-(α-phenylaminoethyl)-imidazoline, which corresponds to the formula:

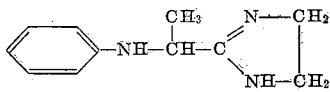

and by salts of this imidazoline with various acids.

Various 2-phenylaminoalkyl-imidazolines are already known, as for example 2-phenylaminomethylimidazoline which is most nearly comparable with the imodazoline of the present invention. Of the 2-phenylaminomethyl-imidazoline, it was known that it possesses a strong effect upon the blood pressure and the blood vessels. In contradistinction to this, the imidazoline of the present invention only exhibits this effect to a minor extent. On the other hand, it exceeds 2-phenylaminomethyl-imidazoline, of which any property of stimulating the heart was not known, by four times in its effect upon the coronary flow and by ten times in its effect upon the pulse rate. The new compounds of the present invention can therefore be employed as medicaments for the indicated purpose, namely, effecting coronary dilatation and increase in pulse rate.

The new imidazoline is obtained according to the invention by reacting a reactive ester of 2-(α-hydroxyethyl)-imidazoline with aniline or one of its N-metal compounds, such as N-alkali-metal, for example N-sodium or N-lithium, compounds. As reactive esters of 2-(α-hydroxyethyl)-imidazoline, there are used especially esters with strong inorganic or organic acids, as for example of hydrohalic acids and alkyl and aryl sulfonic acids. These esters can be used either in the form of the bases or of their salts. The reaction may be carried out in the presence or absence of diluents and/or condensing agents or catalysts such as sodium iodide.

According to a further embodiment of the process of the invention, the α-phenylaminopropionic acid or one of its functional acid derivatives is reacted with ethylene diamine or with a compound convertible into ethylene diamine by the action of ammonia or with a reactive N-derivative of ethylene diamine, with the direct or step by step formation of the imidazoline ring. As functional acid derivatives there can be used for example the imidoethers, imidohalides, thio-imidoethers, thioamides, amides, esters, halides, amidines and the nitrile. Instead of using the acid derivatives themselves as starting materials, the process can also be carried out under such conditions that these are produced in the course of the reaction. When the nitrile is reacted directly with ethylene diamine or its derivatives, the reaction is advantageously carried out in the presence of hydrogen sulfide or agents which form hydrogen sulfide, such as carbon disulfide. The reaction of the nitrile with the ethylene diamine can also be carried out in such a manner that the latter is employed in the form of a mono-salt. Compounds which are convertible into ethylene diamine by reaction with ammonia are for example aminoethanol and its esthers and also ethylene dihalides. In this modification of the process, according to the reaction components employed, the reaction must be conducted in the presence of ammonia or an agent providing ammonia. Reactive N-derivatives of ethylene diamine to be employed in the process are such as react with the formation of imidazolines which are unsubstituted on the nitrogen, as for example ethylene urea. In carrying out the process in stages, for example the α-phenyl-amino-propionic acid or one of its functional acid derivatives, is reacted with the ethylene diamine to form the corresponding acyl ethylene diamine and from the latter by splitting out of water, for example with calcium oxide, the imidazoline ring is formed.

The reaction conditions vary according to the starting materials used. Thus the reaction can be carried out in the presence or absence of diluents and/or condensing agents at low or at raised temperatures and under various pressures. Moreover one of the reaction components may be employed in excess.

Depending upon the process employed, the new imidazoline is obtained as the free base or in the form of its salts. From the base, the salts—for example, the hydrohalides, sulfate, nitrate, phosphate, thiocyanate, acetate, propionate, oxalate, malate, citrate, benzoate, methane sulfonate, ethane sulfonate, hydroxyethane sulfonate, benzene sulfonate or toluene sulfonate, etc.—can be produced with the aid of the corresponding acids.

The following examples set forth—solely by way of illustration and not by way of limitation—exemplary embodiments of the invention. In these examples, the relation between parts by weight and parts by volume is the same as that between the kilogram and the liter. Temperatures are expressed in degrees centigrade.

Example 1

25 parts by weight of α-phenylamino-propionic acid imidomethyl ether dihydrochloride (produced by the action of hydrogen chloride on a mixture of equivalent quantities of α-phenyl-amino-propionitrile and methyl alcohol in chloroform solution) are introduced with ice cooling into an alcoholic solution of 6.5 parts by weight of ethylene diamine. The mixture is stirred for ½ hour at about 10°, then slowly heated to boiling and maintained for 1 hour at this temperature. After cooling, the reaction mass is neutralized with a little alcoholic hydrochloric acid and filtered with suction. On addition of ethyl acetate or ether, the 2-(α-phenylaminoethyl)-imidazoline hydrochloride produced crystallizes in the form of colorless crystals which are easily soluble in water. After recrystallization from isopropyl alcohol, they melt at 206–207°.

From the aqueous solution, concentrated caustic soda solution precipitates the free base which after recrystallization from isopropylether melts at 89–90°. From the base, dissolved in alcohol, ethyl acetate, or ether, there are obtained by the addition of an equivalent quantity of an acid the corresponding imidazoline salts, such as the hydrobromide, sulfate, acetate, propionate, methane sulfonate, or toluene sulfonate. From the concentrated aqueous solution of the hydrochloride there are obtained by the addition of a concentrated aqueous solution of sodium iodide, sodium thiosulfate, sodium nitrate, or ammonium thiocyanate, the corresponding iodide, thiosulfate, nitrate, or thiocyanate.

Instead of the α-phenylamino-propionic acid imidomethyl ether dihydrochloride, an equivalent quantity of the imidoether of another alcohol or also of a corresponding thioimido ether can be used. Instead of the dihydrochloride, the free imidoether base can be reacted, if desired in the presence of a salt of ethylene diamine, or alternatively another salt of the imidoether, such as the dihydrobromide, may be used in lieu of the dihydrochloride.

Example 2

16.9 parts by weight of 2-(α-chlorethyl)-imidazoline hydrochloride are heated with 23.2 parts by weight of aniline and 1.0 part by weight of sodium iodide for 4 to 6 hours in an oil bath at 135–145°. After cooling to about 80°, 150 parts by volume of water are added. The liquid produced is adjusted in the cold with caustic soda solution to neutrality to litmus, then extracted with ether. The remaining aqueous solution is clarified, evporated in vacuum to dryness and from the residue the 2-(α-phenylamino-ethyl)-imidazoline hydrochloride produced dissolved out with hot isopropyl alcohol. On cooling, the hydrochloride separates out as colorless crystals, melting at 206–207°, which are identical with the compound described in Example 1.

In this example, the 2-(α-chlorethyl)-imidazoline hydrochloride can be replaced by an equivalent quantity of another 2-(α-halogenethyl)-imidazoline. Also the free base or another salt can be used.

Example 3

20 parts by weight of α-phenylamino-propionic acid amidine hydrochloride, melting at 197–198° (produced from the imidoether mentioned in Example 1 by reaction with ammonia) are heated with 6.5 parts by weight of ethylene diamine in alcoholic solution for 6 hours to boiling. When the reaction is complete, the solution is adjusted to neutrality to litmus with alcoholic hydrochloric acid, clarified and the 2-(α-phenylaminoethyl)-imidazoline hydrochloride separated in crystalline form by the addition of ethyl acetate. It is identical with the compound of Examples 1 and 2.

Example 4

18.0 parts by weight of α-phenylamino-propionic acid thioamide, 6.5 parts by weight of ethylene diamine and 10 parts by volume of alcohol are heated under reflux on the water bath for 3 hours and then heated for a further 2 hours under reduced pressure. The reaction mass is rendered slightly acid with dilute hydrochloric acid, the solution freed from a little undissolved substance with methylene chloride, and the aqueous phase evaporated in vacuum. By recrystallization of the residue from isopropanol or from a mixture of alcohol and ethyl acetate, the 2-(α-phenylaminoethyl)-imidazoline hydrochloride is obtained (melting point 206–207°).

Example 5

2.2 parts by weight of hydrogen sulfide are passed into a mixture, cooled with ice-common salt, of 29.2 parts by weight of α-phenylamino-propionic acid nitrile, 15 parts by weight of ethylene diamine and 100 parts by volume of alcohol and the whole is allowed to stand for about 40 hours at 25–35° in a closed vessel in a nitrogen atmosphere. Then the solvent is distilled off, replaced by fresh alcohol and this also distilled off, finally in a vacuum. The residue is neutralized with dilute hydrochloric acid and the nonbasic portions extracted with ether. The aqueous solution is evaporated in vacuum and the hydrochloride of the imidazoline dissolved out with alcohol. After evaporation of the solvent and recrystallization of the residue from a mixture of alcohol and ethyl acetate, the 2-(α-phenylaminoethyl)-imidazoline hydrochloride is obtained (melting point 206–207°).

In this reaction it is possible to replace the hydrogen sulfide by a corresponding quantity of carbon disulfide or by another agent providing hydrogen sulfide. Instead of the ethylene diamine and hydrogen sulfide a corresponding quantity of a mono-salt, such as mono-hydrochloride or mono-toluene sulfonate can be used, if desired in the presence of a little free ethylene diamine.

Having thus disclosed the invention, what is claimed is:

1. A member selected from the group consisting of 2-(α-phenylaminoethyl)-imidazoline and its salts with acids.

2. 2-(α-phenylaminoethyl)-imidazoline.

3. 2-(α-phenylaminoethyl)-imidazoline hydrochloride.

References Cited in the file of this patent

UNITED STATES PATENTS

| Number | Name | Date |
| --- | --- | --- |
| 2,252,721 | Miescher et al. | Aug. 19, 1941 |

FOREIGN PATENTS

| Number | Country | Date |
| --- | --- | --- |
| 234,988 | Switzerland | Mar. 16, 1945 |
| 235,951 | Switzerland | June 16, 1945 |
| 235,953 | Switzerland | June 16, 1945 |
| 235,954 | Switzerland | June 16, 1945 |

OTHER REFERENCES

Urech et al., Helv. Chim. Acta, vol. 33, pp. 1386–1407 (1950).